Nov. 13, 1923.

J. HETTRICH 1,473,907

MECHANICAL MOVEMENT

Filed June 16, 1922

John Hettrich  INVENTOR.

BY

*Emil F. Lang* ATTORNEY

Patented Nov. 13, 1923.

1,473,907

UNITED STATES PATENT OFFICE.

JOHN HETTRICH, OF LINCOLN, NEBRASKA.

MECHANICAL MOVEMENT.

Application filed June 16, 1922. Serial No. 568,817.

*To all whom it may concern:*

Be it known that I, JOHN HETTRICH, a citizen of the United States, residing at Lincoln, in the county of Lancaster and State of Nebraska, have invented certain new and useful Improvements in Mechanical Movements, of which the following is a specification.

My invention relates to mechanical movements, and more particularly to a mechanical movement involving a continuous series of levers and resulting in its operation in a continuous leverage action.

In the ordinary types of gearing a lever action is present, but the time element varies according to the ratio of the gear diameters. It is my object to provide a gearing having not only the continuous leverage effect, but in which the design may be so varied as to vary the time element at will.

Having in view these and other objects which will appear in the description, I will now refer to the drawings, in which—

Figure 1:
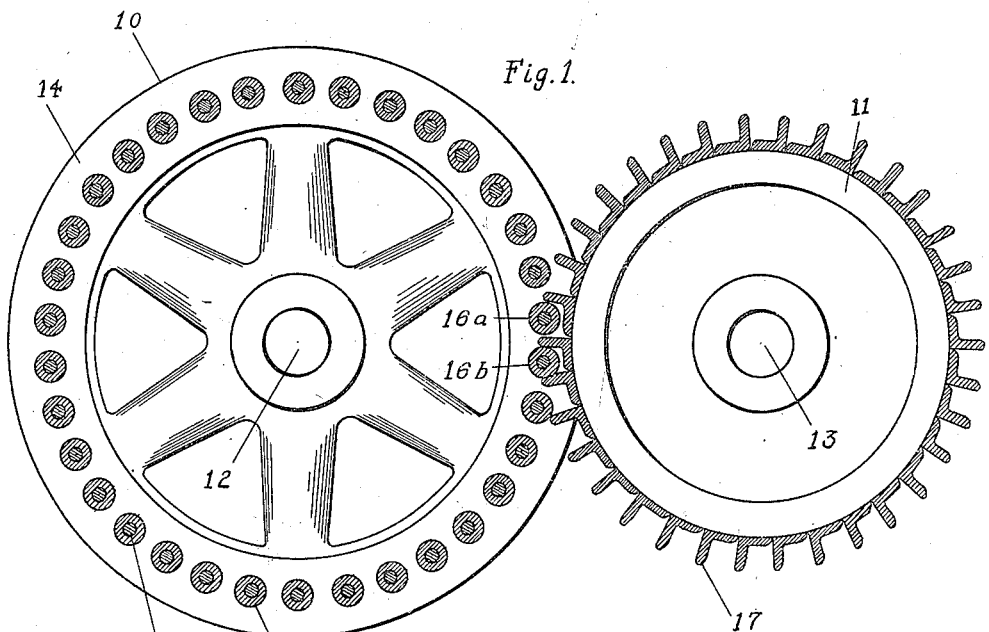
Figure 1 is a median section through the drums of my gearing, parts being omitted for clearness.

The specific construction shown is only one of the many forms which my invention may take. I mount two drums 10 and 11 on the shafts or axles 12 and 13. The shafts 12 and 13 are in exact parallelism and are rigidly held in spaced relation at both of their ends.

The drum 10 which in this instance is the larger of the two, has end discs 14 suitably mounted on the shaft 12. In each disc 14 are apertures for the reception of the shafts 15. These apertures are equidistantly spaced on a circumference of which the axis of rotation is the center, and both end discs are identical with respect to the size, number, and positions of the apertures. Each shaft 15 is mounted at its ends in the apertures in the discs 14. The shafts 15 are parallel to each other but each shaft is non-parallel to the axis of rotation. To bring about this relationship I prefer to offset one end of each shaft from the other end by securing the shafts through apertures which are out of horizontal alignment with each other but adjacent the horizontal line. The body portion of each shaft 15 is larger in diameter than the end portions, and this body portion constitutes a roller 16. In practice I reduce the end portions of a cylindrical rod. By thus reducing the ends on a lathe I produce a roller 16 with shaft ends 15 integral therewith, but I may in certain cases use shafts 15 on which are mounted tubular rollers 16. I introduce non-friction devices in the bearings at the ends of the shafts. These non-friction devices are not shown in my drawings since they constitute no part of my invention.

Figure 2:
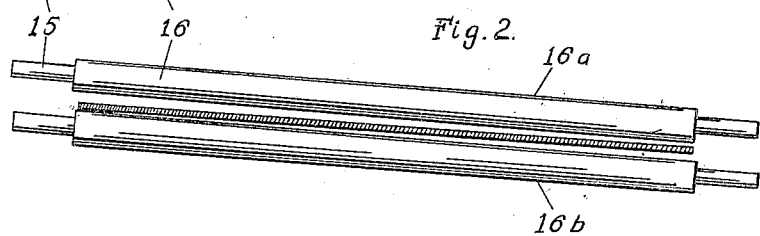
Figure 2 shows the interaction of two of the rollers with one of the teeth when in full mesh.

On the periphery of the drum 11 I secure a series of radially extending teeth 17. These teeth as shown are formed by securing lengths of angle iron to the drum, but if preferred other and equally effective methods of applying the gear teeth 17 may be employed. These teeth like the rollers 16 are offset so that while they are parallel to each other, they are non-parallel to the axis of rotation. It should also be noted that the rollers 16 are spaced apart a distance which is appreciably greater than the width of the teeth 17 and that the teeth 17 are offset at such an angle that any tooth 17 when in full mesh with two of the rollers 16, will extend almost diagonally across the space between those two rollers as shown in Figure 2.

The interaction of the drums can be explained by reference to Figures 1 and 2, Figure 2 being a view of two of the rollers and of one of the teeth as they appear when viewed from the shaft 13 looking toward the shaft 12. If rotative motion in a counter clockwise direction is imparted to the drum 11 (as viewed from the side shown in Figure 1) then the teeth 17 acting on the rollers 16 will cause the drum 10 to rotate in a clockwise direction. Owing however to the relative positions and inclinations of the teeth and rollers, the meshing tooth has only one point of contact at a time with the corresponding roller. As viewed in Figure 2, the tooth first engages the roller 16$^b$ on its right hand end. The downward pressure of the tooth on the roller 16$^b$ causes that roller to move the drum 10 on its axis 12. At the same time the combined effect of the rotative motion of the drum 10 and the pressure of the tooth is to cause the roller 16$^b$ to rotate on its axis but in a direction contrary to that of the rotation of the drum. The net result of this action is that the tooth gradually climbs on the roller 16<sup>b</sup> from one end to the other. During this climbing, the point of contact of the tooth with the roller 16<sup>b</sup> moves from the right to the left in Figure 2. In this figure the tooth is at a point in its rotation where it is ready to leave the roller 16<sup>b</sup>. It will be noticed that the left hand end of the tooth is still in contact with the roller 16<sup>b</sup>, but the right hand end of the tooth is almost in contact with the under side of the roller 16<sup>a</sup>. When this point is reached the next succeeding tooth is ready to engage the right hand end of the roller 16<sup>a</sup> where the same sequence is repeated as with the roller 16<sup>b</sup>.

It should be noted that the teeth 17 correspond in number to the rollers 16, and that each roller is acted upon by the same tooth in successive rotations. It will thus be seen that for every revolution that the drum 11 makes, the drum 10 will make a corresponding revolution, or in other words, the angular velocity of the two drums is equal.

Figure 3:
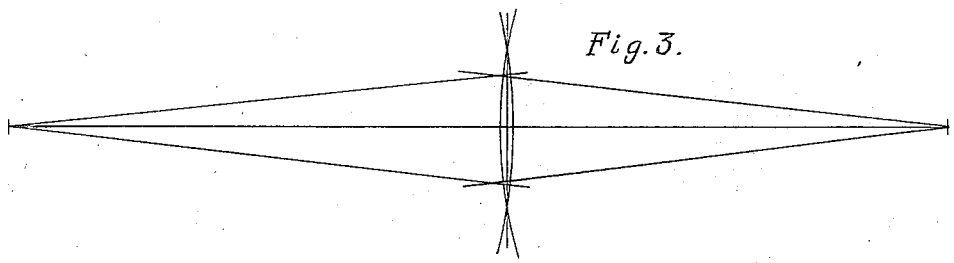
Figure 3 shows in diagrammatic form the leverage action, the parts in the figure being shown in the same ratio as those in Figures 1 and 2, but to a larger scale.

Figure 3 gives a graphic analysis of the forces described in connection with the movement of the drums. The two extremities of the horizontal line represent the centers of rotation of the two drums. The two arcs having these points as centers have radii whose ratio is equal to the ratio of the effective radii of the drums 10 and 11. The chord subtended by both of the arcs is intersected by the sides of the equal angles whose vertices are the centers of rotation of the drums. The sides of the angles however intersect the chord at different points. Inspection of Figure 3 will show that the angle at the left cuts off a larger portion of the chord than that cut off by the angle at the right in that figure. The difference in lengths of these two portions of the chord represent the gain made by the climbing of one of the teeth 17 on its corresponding roller 16.

Thus far I have confined my description to a pair of gear drums having equal numbers of intermeshing devices but with unequal radii of rotation. The lengths of the radii as well as the ratio between these lengths, and the lengths of the drums are all susceptible of wide variation without departing from the spirit of my invention. Likewise if the teeth 17 and rollers 16 are unequal in number, the same operation takes place if the teeth and rollers are properly offset in their relation to each other. It is thus possible to bring about not only equality of angular velocities in gears having unequal radii of rotation, but also to cause inequality of angular velocity in gears having equal radii of rotation. I have shown the preferred form which my invention may take, but it is apparent that the principle of operation may be applied to gears which vary widely in their relative arrangement of parts, and I want it to be understood that I do not relinquish any of the equivalents of the specific structure which I have shown and described.

Having thus described my invention, what I believe to be new and desire to secure by Letters Patent of the United States is:—

1. Two intermeshing gear drums having unequal radii of rotation, and intermeshing gear devices on said drums for causing said drums to rotate at equal angular velocities, the intermeshing elements of said gear drums being continuous and uninterrupted throughout the lengths of the drums.

2. Two intermeshing gear drums, one of said drums having radially extending teeth extending from side to side of the drum, the other of said drums having roller bearings for engagement with the teeth of said first mentioned drum, said roller bearings being parallel to each other but non-parallel to the axis of rotation, said roller bearings also being spaced apart a distance greater than the width of the teeth of said first mentioned drum.

3. A pair of gear drums, shafts for said drums, said shafts being rigidly held in parallel and spaced-apart relation, radially projecting teeth on the cylindrical surface of one of said drums, said teeth being spaced apart and parallel to each other but non-parallel to their axis of rotation, roller bearings on the other of said drums, said roller bearings also being spaced apart and parallel to each other but non-parallel to their axis of rotation, said teeth and roller bearings being adapted to mesh with each other and being so arranged that when they are in full mesh the meshing tooth will be substantially diagonal in the space between two adjacent rollers.

In testimony whereof I affix my signature.

JOHN HETTRICH.